April 5, 1949.  M. JOVANOVICH  2,466,316
HYDRAULIC FITTING
Filed June 18, 1945
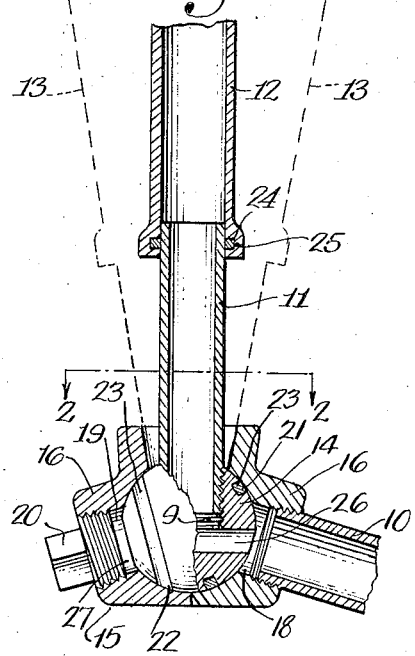
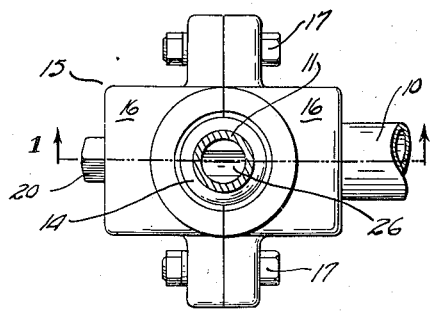
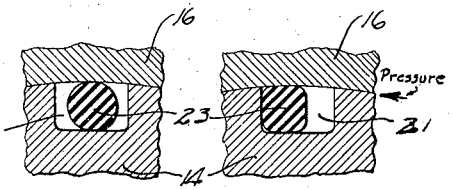
Milton Jovanovich
INVENTOR.

Patented Apr. 5, 1949

2,466,316

UNITED STATES PATENT OFFICE 2,466,316

HYDRAULIC FITTING

Milton Jovanovich, Detroit, Mich., assignor to Ford Motor Company, Dearborn, Mich., a corporation of Delaware Application June 18, 1945, Serial No. 600,044

2 Claims. (Cl. 285—97.3)

This invention relates to fittings for hydraulic pressure lines of the type used in connection with various hydraulically actuated devices in aircraft and other vehicles; and, more particularly, to a universal joint fitting which may be used in such power lines to permit the required degree of flexibility of mounting between the hydraulically actuated device and the hydraulic source.

Recent years have seen a considerable increase in the number of hydraulically operated and controlled mechanisms, particularly in the aircraft field. There is a large number of auxiliaries on each plane such as wing flaps, control surfaces, landing gear, turrets and the like, which frequently are hydraulically operated. A further development has been the increase in the operating pressures in the hydraulic line which now may be in excess of 1,000 pounds per square inch; and, while conventional piping methods are adequate for the relatively fixed installation, as soon as the operated device is flexibly supported—as for instance in a machine gun mounting—the problem of suitable supply conduits becomes much more difficult of solution. It is possible to use flexible hoses of various available designs, but when such a hose is designed to withstand the higher pressures, its size is excessive and its weight is disadvantageous. Thus, if one were to mount an independently controllable gun unit in a turret, the supply lines leading to the gun would seriously limit the normal field of vision from the turret as well as occupying considerable room in an already restricted space. Metal tubing can be made in much smaller sizes and is much lighter and would be used in preference, if suitable fittings were available, permitting the desired flexibility in the system. However, the same factor which renders the flexible tubing unsatisfactory—namely, the high pressures involved—imposes similar limitations on the use of conventional joints in metal lines, since leakage is excessive and the line pressure causes binding between the relatively movable parts of conventionally designed joints.

The advantages of the present invention number, among others, a balanced construction which is free from binding and readily operable within the range of movement provided and a leakproof fitting which is efficient under the most adverse operating conditions and higher pressures. The general constructions shown may be modified to obtain practically any degree of movement required and by proper arrangement of the basic parts in these constructions, the particular advantages inherent in them can be maintained. The balancing of the forces on the movable parts may be effected, generally, by proper choice of communicating chambers to balance the hydraulic pressures imposed upon them. In addition, the back pressures from the line may be taken care of by angular installation affording counterbalancing forces having a properly directed resultant. The sealing means employed are highly efficient despite their compactness and are particularly adaptable to use with either the spherical or cylindrical surfaces which necessarily form the basis for this type of fitting.

With these and other objects in view, the invention consists in the arrangement and constructions described in the specification, claimed in the claims, and illustrated in the accompanying drawings, in which:

Figure 1 is a sectional elevation through one type of joint constructed according to this invention, and taken substantially on the line 1—1 of Figure 2.

Figure 2 is a plan view of an angular fitting shown in Figure 1.

Figures 3 and 4 are sectional elevations on an enlarged scale showing the particular sealing means employed as assembled and when the fluid pressure is applied, respectively.

Referring first to Figures 1 and 2, the universal coupling there shown is one in which the line tube in its mean position is substantially normal to the discharge tube 11. The latter tube is made up of one or more relatively sliding sections 12 permitting axial elongation or contraction, and the range of angular movement of the assembled tube is indicated by the dotted lines 13. The lower end of the discharge tube 11 is threadedly engaged in a tapped hole 9 in the ball 14 which, in turn, is rotatably seated in a socket in the housing 15 formed of the two castings 16 bolted together at 17. The housing 15 is provided with two angularly disposed tapped holes 18 and 19, the former threadedly receiving the line tube 10 and the latter being closed by a plug 20. The surface of the ball 14 is formed with two grooves 21 and 22 arranged in planes substantially normal to the holes 18 and 19 when the discharge tube 11 is in its mean position and in each of which is seated one of the sealing O rings 23. This sealing structure is also used between the discharge tube 11 and the sliding sections 12—in that case the outer member 12 is circumferentially grooved at 24 as a seat for the O ring 25. The ball 14 is also provided with transverse channel 26 communicating with the discharge tube 11 through the hole 9, the line tube 10 through the tapped hole 18, and the chamber 27 formed in the tapped hole 19 by the plug 20. Thus, the pressure of the hydraulic fluid in the line tube 10 is more or less balanced, so far as the ball 14 is concerned, by the pressure existing in the chamber 27; and the back pressure from the discharge tube 11, at least in its mean position and substantially throughout the allowable angular range is balanced by the resultant of the pressures in the line tube 10 and the chamber 27, accounting for the angular disposition of the tapped holes 18 and 19 in which their axes intersect the axis of the discharge tube 11 when in mean position at substantially equal obtuse angles.

The sectional views of Figures 4 and 5 show in detail the operation of the sealing device, particularly applied as in Figure 1. A section of the ball 14 is shown in the housing 15. The ball 14 has a circumferential groove 21 which is substantially rectangular in section. The depth of the groove 21 is substantially less than its width and the sealing O ring 23 (which may be formed of rubber or any of the other similar resilient material, which will not be adversely affected by the fluids to be conducted by the fitting) is originally circular in section with its sectional diameter just slightly larger than the depth of the groove 21. This, of course, leaves a substantial clearance between the sides of the groove 21 and the ring at 23. When the seal is subjected to fluid pressure, the ring 23 assumes a section similar to that shown in Figure 5 and becomes substantially rectangular and is driven against the side of the groove 21 remote from the source of the pressure (the hole 18) perfecting the seal between the bottom of the groove 21, the exposed inner face of the housing 15 and the remote side of the groove 21. This is a very efficient sealing means within the range of relative speeds and the amplitude of movement obtaining in the present devices. It is particularly suited to the sealing of the spherical member where conventional sealing means are very difficult to apply. The diameter of the ring 23 is just large enough so the ring will be held against the bottom of the groove 21 without substantial deformation of the circular section pulling its upper surface away from the surface of the ball seat. It should be noted, however, that but one groove and ring should be used in any one sealing surface for a maximum efficiency. If the seal is duplicated, the requisite pressure leading to proper deformation is not always impressed upon the more remote of the two seals; and there may at times be a slight back pressure against the nearer of them unseating it. Nothing is added or gained through this duplication; and, in fact, there may be a serious loss in sealing efficiency.

The advantages of the present construction are that a flexible fitting is obtained which is very easily operated, even under hydraulic pressures in the higher ranges, and which is compact and leakproof. It is particularly adapted to replace the flexible hoses heretofore used in connecting hydraulically operated flexibly supported component in which the hydraulic motor is mounted on the component itself, as it is much lighter and less cumbersome than the conventional means for conducting the actuating fluid. It is apparent that by judicious combinations of angular movement at the fitting and the use of sliding sections in the tubes themselves to change their length, any desired relative movement between the hydraulic line and the moving, hydraulically actuated object can be obtained throughout a wide range.

Some changes may be in the detailed constructions shown herein, but it is the intention to cover by the claims such changes as may reasonably be made within the scope thereof.

The invention claimed is:

1. In a flexible fitting adapted to be connected between reaches of rigid pipe and provide communication therebetween, comprising, a housing having an internal ball seat and fluid reservoirs angularly disposed on opposite sides thereof and in communication therewith, means securing one of said reaches to said housing in communication with one of said reservoirs, a ball rotatably mounted in said seat and having another said reach secured thereto and extending outwardly therefrom through said housing, a diametral bore through said ball communicating with both said reservoirs and with said other reach, said reservoirs being obliquely disposed with their centerline making a substantially equal obtuse angle with the centerline of said other reach, and a pair of spaced circumferentially disposed ring sealing means carried on said ball on each side of said other reach and arranged substantially normally to the axes of said reservoirs.

2. In a flexible fitting adapted to be connected between reaches of rigid pipe and provide communication therebetween, comprising, a housing having an internal ball seat and a fluid reservoir on opposite sides thereof communicating therewith, means securing one of said reaches to said housing in communication with one of said reservoirs, a ball rotatably mounted in said seat and having another said reach secured thereto and extending outwardly therefrom through said housing, a channel through said ball communicating with each of said reservoirs and said other reach, said reservoirs being formed by bores in said housing having their axes intersecting the axis of said other reach when in mean position at equal obtuse angles, and a pair of spaced circumferentially disposed ring sealing means carried on the surface of said sphere on each side of said other reach and arranged substantially normally to the axes of the respective said reservoirs.

MILTON JOVANOVICH.

REFERENCES CITED

The following references are of record in the file of this patent:

UNITED STATES PATENTS

| Number | Name | Date |
|---|---|---|
| 170,058 | Cole | Nov. 16, 1875 |
| 1,754,127 | Srulowitz | Apr. 8, 1930 |
| 2,180,795 | Christensen | Nov. 21, 1939 |
| 2,370,964 | Janette | Mar. 6, 1945 |
| 2,377,196 | Walley | May 29, 1945 |
| 2,417,491 | Hill | Mar. 18, 1947 |